United States Patent
Jacob et al.

(10) Patent No.: US 7,433,101 B2
(45) Date of Patent: Oct. 7, 2008

(54) METHOD OF DEFINING A DEVICE COLOR PROFILE FOR A COLOR OUTPUT DEVICE

(75) Inventors: Steve A Jacob, Boise, ID (US); Mark Shaw, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1092 days.

(21) Appl. No.: 10/820,954

(22) Filed: Apr. 7, 2004

(65) Prior Publication Data

US 2005/0225784 A1    Oct. 13, 2005

(51) Int. Cl.
   *G03F 3/08*    (2006.01)
(52) U.S. Cl. .................. 358/518; 358/1.9; 358/504; 382/167
(58) Field of Classification Search ............. 358/1.9, 358/504, 518, 523, 524; 382/162, 167
   See application file for complete search history.

(56) References Cited

U.S. PATENT DOCUMENTS 6,585,340 B1 *   7/2003   Borrell ................ 347/14

* cited by examiner

*Primary Examiner*—King Poon
*Assistant Examiner*—Nathan K Tyler
(74) *Attorney, Agent, or Firm*—Matthew L. Wade

(57) ABSTRACT

A method of defining a device color profile is described. The method may include (a) storing a first set of color descriptions, wherein each color description describes a color of a different printed test patch in a first target and includes: (i) a set of color component values defined in an overlapping color space, and (ii) at least one color component cross term; (b) obtaining a second set of color descriptions, wherein each color description in the second set describes a color of a different printed test patch in a second target and includes: (i) a set of color component values defined in the overlapping color space, and (ii) at least one color component cross term; and (c) using the stored first set of color descriptions and the second set of color descriptions to define a device color profile.

26 Claims, 12 Drawing Sheets ns and digital cameras. Examples of color output devices
METHOD OF DEFINING A DEVICE COLOR PROFILE FOR A COLOR OUTPUT DEVICE

BACKGROUND OF THE INVENTION

There are many different kinds of color input and color output devices. Examples of color input devices include scanners and digital cameras. Examples of color output devices include printing devices (e.g., inkjet printers, laser printers, offset printing devices, etc.) and display devices (e.g., CRT devices, video projectors, etc.).

Because many of these devices can interpret colors differently, device color profiles are often used to enable color information to be accurately shared and reproduced across platforms. A color printing device, for example, may make use of a device color profile to transform color information into the device's own local color space. The device color profile typically accounts and/or corrects for various characteristics of the color printing device including, for example, the media type presently being used. An example of a standardized device color profile format is provided by the International Color Consortium (ICC).

A characterization procedure is often used to define a device color profile for a color output device, such as a color printing device.

A typical characterization procedure, as applied to a color printing device, may involve the use of a characterization target that includes a number of different color fields each having a unique intended color value. For ease of discussion, a color field in a characterization target may be referred to herein as a "test patch".

The printing device prints the characterization target and the color value of each printed test patch is measured. These measurements, along with the known intended color values of each test patch, are subsequently used to define the device color profile for the printing device.

It would be desirable to reduce the number of test patch measurements needed to define a suitable device color profile for a color output device as this could reduce, for example, the amount of time needed to perform a characterization. One prior art solution to this problem is described in a patent entitled "PRINTER CHARACTERIZATION ADJUSTMENT FOR DIFFERENT PAPERS", having U.S. Pat. No. 6,654,143. That Patent is incorporated herein by reference.

Improved solutions, however, are needed.

DETAILED DESCRIPTION OF THE INVENTION

1. Color Spaces

It is understood that a color can be specified by a set of values (typically three or four values) within a defined color encoding examples of such include XYZ, CMYK, and spectral data. For purposes of this document a set of values that specify a color within a particular color space may be referred to generally herein as a set of "color components". Thus, for example, a set of RGB values that specifies a color in an RGB color space may alternatively be referred to herein as a set of "color components" or more specifically as a set of "RGB" color components.

2. Measured Color Spaces

It is also understood that some color spaces can define a color of an object using the following components:
1. An illumination I ($\lambda$) of the object;
2. A spectral reflectance R($\lambda$) of the object;
3. A set of pre-defined wavelength functions.

For ease of discussion, a color space that can define a color using these three components may be referred to herein as a "measured color space". The set of pre-defined wavelength functions may generally be referred to herein as the "spectral sensitivity functions" of the color space.

An example of a measured color space is provided by the Commission International de l'Eclairage (CIE) 1931 standard. This standard defines a color in terms of three color component values that are known as tristimulus values.

The tristimulus values X, Y and Z may be calculated as follows:

$$X = \int R(\lambda)I(\lambda)\bar{x}(\lambda)d(\lambda); \qquad \text{eqn. 1}$$

$$Y = \int R(\lambda)I(\lambda)\bar{y}(\lambda)d(\lambda); \qquad \text{eqn. 2}$$

$$Z = \int R(\lambda)I(\lambda)\bar{z}(\lambda)d(\lambda) \qquad \text{eqn. 3}$$

Wherein the $\bar{x}(\lambda), \bar{y}(\lambda)$ and $\bar{z}(\lambda)$ functions are an example of a set of spectral sensitivity functions. More specifically, these particular functions are known as the CIE 1931 color matching functions or "CMF's".

Figure 1A:
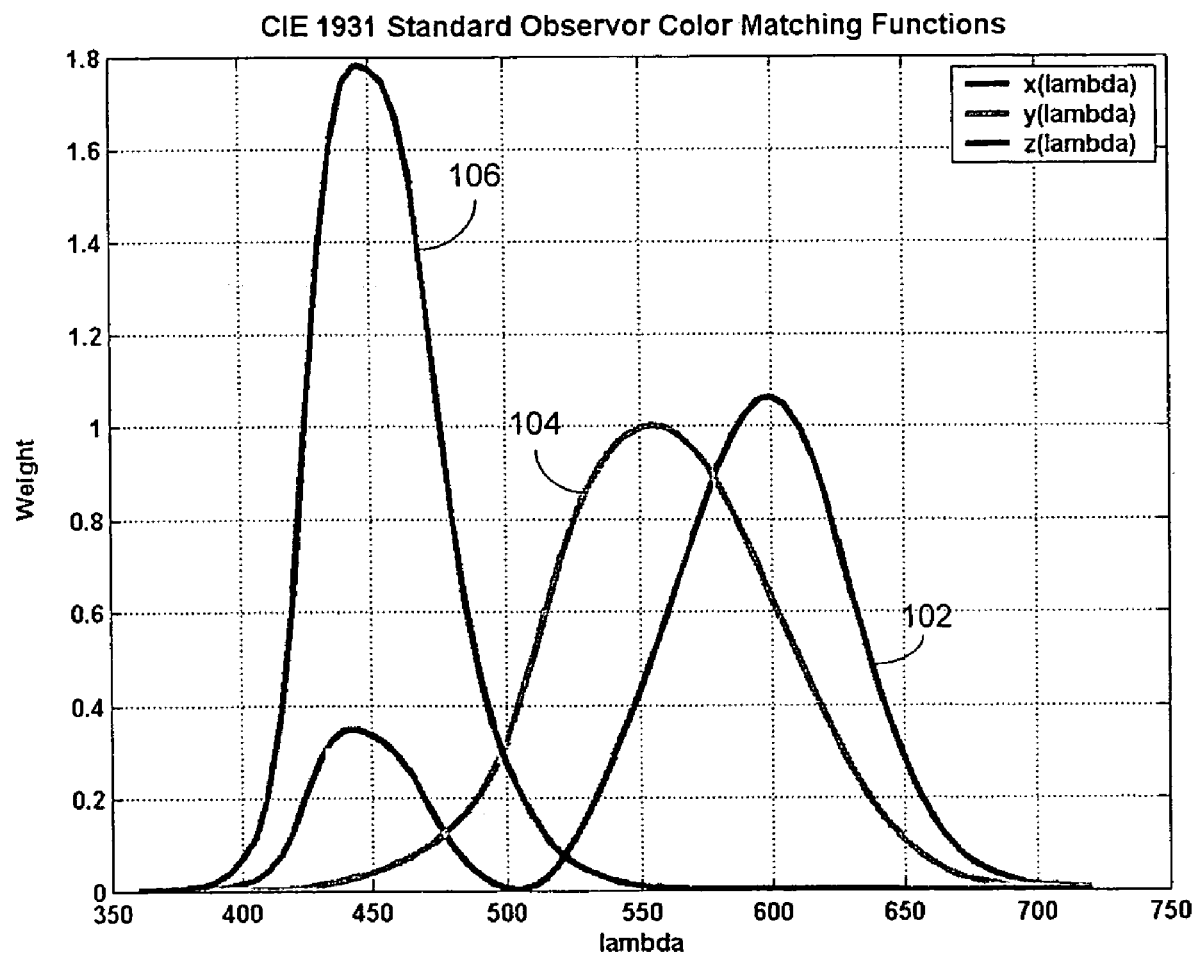
FIG. 1A illustrates the CIE 1931 $\bar{x}, \bar{y}, \bar{z}$ (color matching functions.

For the readers reference, FIG. 1A illustrates the CIE 1931 $\bar{x}, \bar{y}, \bar{z}$ color matching functions wherein:

Curve 102 corresponds to the "$\bar{x}(\lambda)$" color matching function;

Curve 104 corresponds to the "$\bar{y}(\lambda)$" color matching function; and Curve 106 corresponds to the "$\bar{z}(\lambda)$" color matching function

3. Overlapping Spectral Sensitivity Functions

It is noted that in some measured color spaces one or more of the spectral sensitivity functions may overlap at certain wavelengths.

Figure 1B:
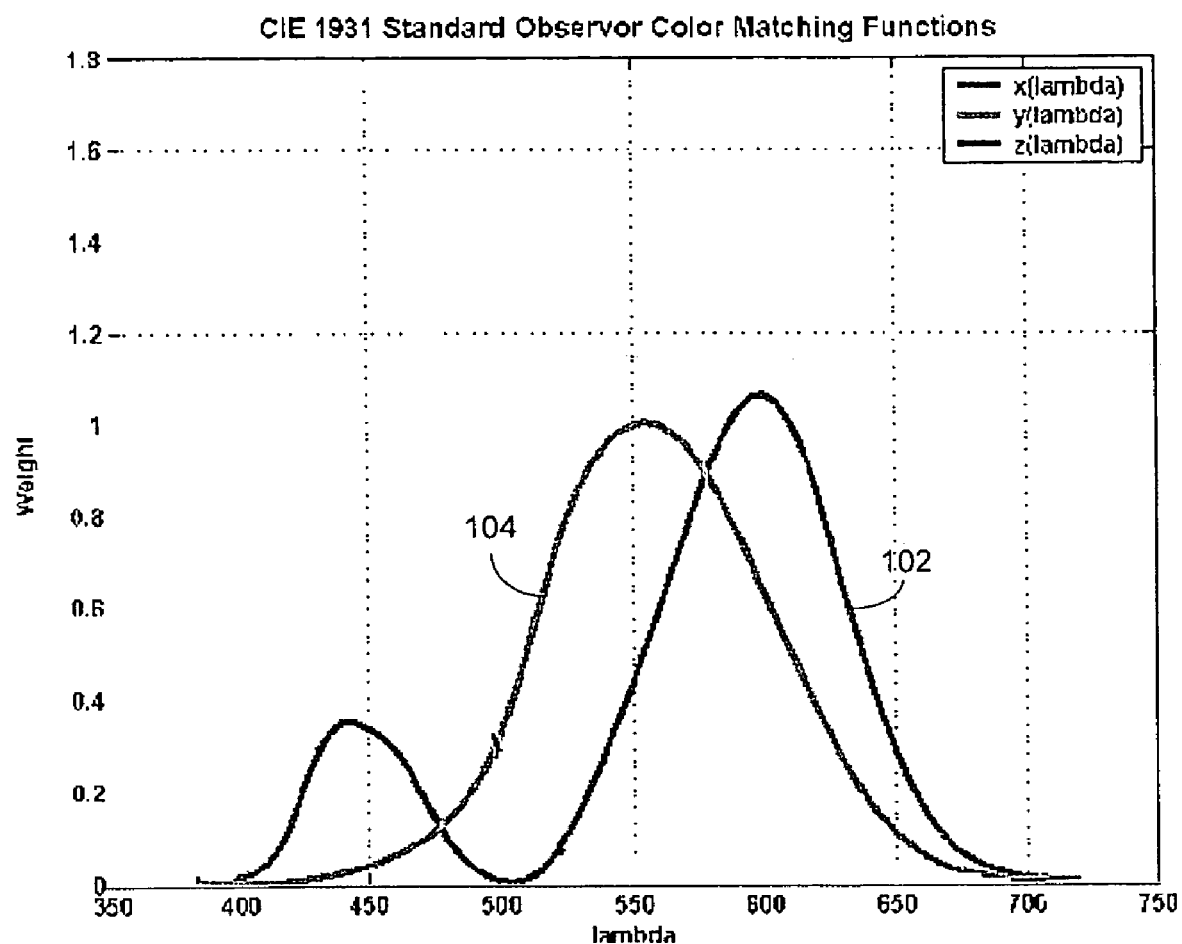
FIG. 1B illustrates the $\bar{x}(\lambda)$ and the $\bar{y}(\lambda)$ color matching functions.
Figure 1C:
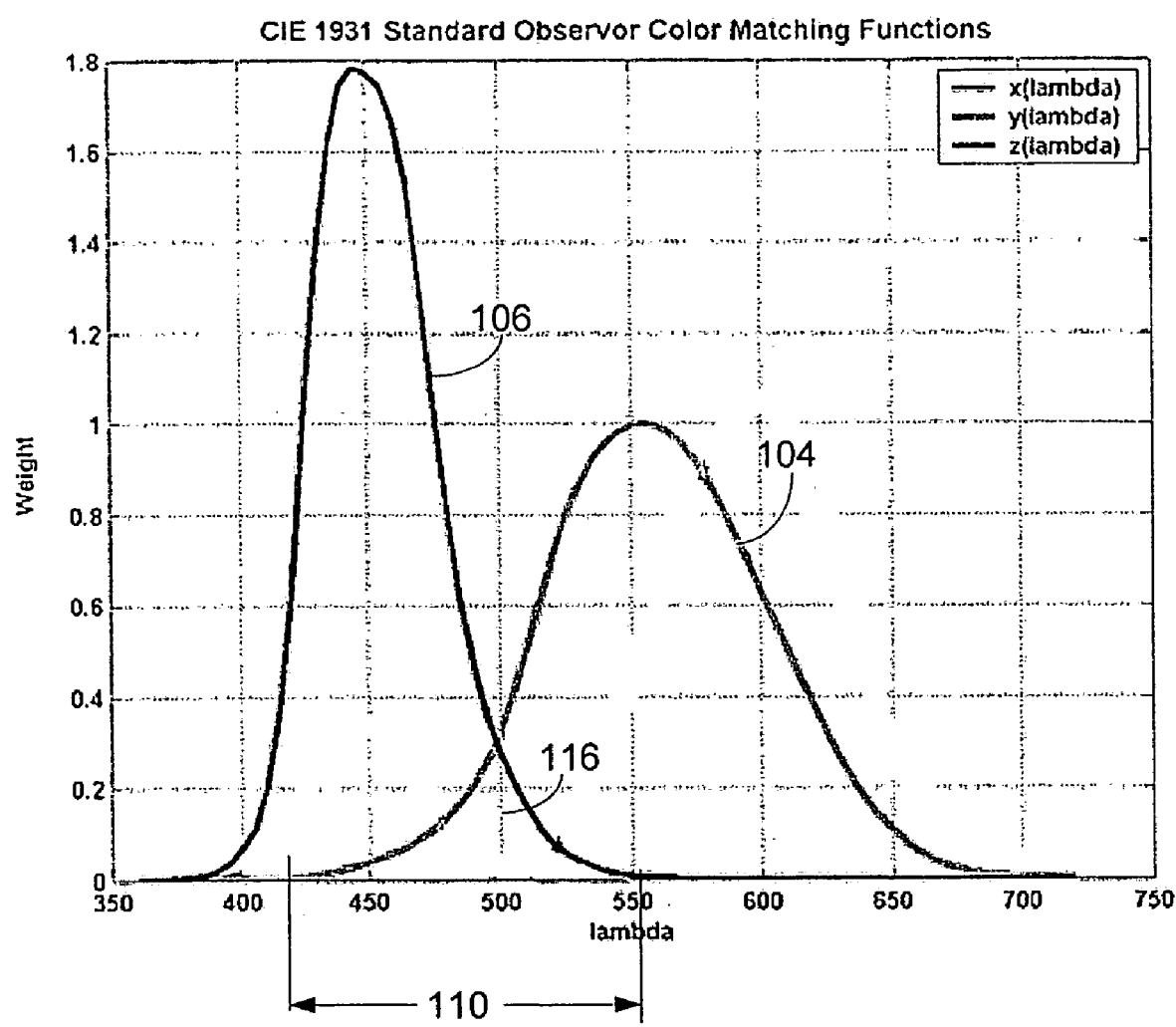
FIG. 1C illustrates the $\bar{y}(\lambda)$ and the $\bar{z}(\lambda)$ color matching functions.

FIG. 1B, for example, illustrates that the "$\bar{x}(\lambda)$" color matching function and the "$\bar{y}(\lambda)$" color matching function overlap at nearly the entire range of wavelengths wherein each function has a non-zero value. FIG. 1C illustrates that the "$\bar{y}(\lambda)$" color matching function and the "$\bar{z}(\lambda)$" color matching function overlap at wavelength region 110.

4. Overlapping Color Spaces

For ease of discussion, a measured color space that defines a set of two or more spectral sensitivity functions that overlap at one or more wavelengths may alternatively be referred to herein as an "overlapping color space". Thus, the CIE 1931 color space is an example of an "overlapping color space" as the $\bar{x}\,\bar{y}\,\bar{z}$ color matching functions overlap.

Examples of other overlapping color spaces include: The CIE 1964 standard observer, Status T spectral primaries, printing densities made from spectral density curves of cyan, magenta, and yellow such as those found in photographic negative film and transparency film.

5. Color Component Cross Terms

As used herein, the phrase "color component cross term" refers to a value that is based upon the multiplication of two or more color component values from a set of color components values that specify a particular color. In this definition of cross terms, the two or color components values can be the same color component (e.g., $X^2$) or different (e.g., XY).

For example, assume the tristimulus values "$X_1, Y_1, Z_1$" specify a particular color. Any value that is based upon the multiplication of two or more of these values may be referred to generally as a "color component cross term". Thus, for example, the following values are considered color component cross terms:

$$\text{Cross term \#1} = X^2 \qquad \text{eqn. 4}$$

$$\text{Cross term \#2} = X_1 Y^1 \qquad \text{eqn. 5}$$

$$\text{Cross term \#3} = (X_1 Z_1)^{1/2} \qquad \text{eqn. 6}$$

$$\text{Cross term \#4} = (X_1 Y_1 Z_1)^{1/3} \qquad \text{eqn. 7}$$

Alternatively, the cross terms described in equations 4-7 may each be referred to as an "XYZ" cross term in order to specify that the cross term value is derived, in this example, from a set of XYZ color components.

6. Overlapping Cross Terms

A color component cross term that is derived from color component values that are defined in an overlapping color space may alternatively be referred to herein as an "overlapping cross term". An XYZ cross term is an example of an "overlapping cross term". Thus, the XYZ cross terms described in equations 4-7 may also be referred to herein as "overlapping cross terms".

It is noted that the value of some overlapping cross terms may be viewed as a partial function of the overlapping areas of the corresponding spectral sensitivity functions. To illustrate, attention is directed to FIG. 1D.

Figure 1D:
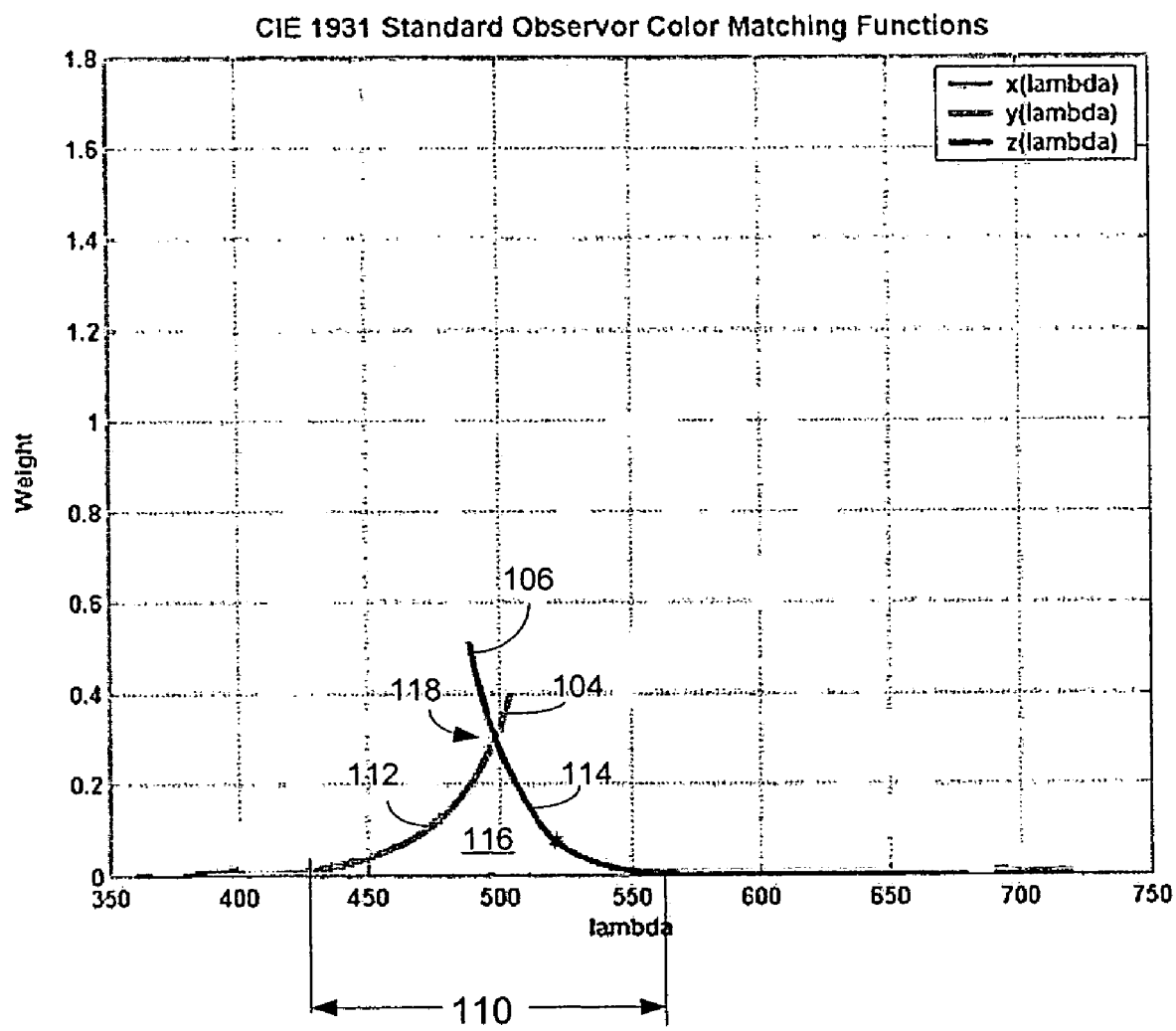
FIG. 1D illustrates a segment of the $\bar{y}(\lambda)$ color matching function and a segment of the $\bar{z}(\lambda)$ color matching function.

FIG. 1D shows a segment 112 of the "$\bar{y}(\lambda)$" color matching function and a segment 114 of the "$\bar{z}(\lambda)$" color matching function. The overlap area 116 below these two curve segments (i.e., below the cross over point 118 of the two curves) may be expressed by the following function:

$$\text{Overlap Area } 116 = \left(\int \bar{y}(\lambda)\bar{z}(\lambda)d(\lambda)\right)^{1/2} \qquad \text{eqn. 8}$$

The reader is asked to compare eqn. 8 to equations 2 and equations 3.

7. Use of Overlapping Cross Terms to Augment Colorimeter Data

There are various types of instruments that can specify a color of an object in terms of an overlapping color space. A calorimeter, for example, typically specifies a color in terms of three XYZ tristimulus values. One problem with a calorimeter, however, is that it does not provide an accurate model of variability in the object's color over local wavelength intervals.

For this reason, sometimes it is preferable to use a spectrophotometer as these devices typically output "spectral data" that characterizes an object's color for a number of different wavelength intervals. A typical spectrophotometer, for example, outputs spectral data that describes the reflectance of an object in, for example, 10 nm intervals over a wavelength range of 380-730 nm. Compare this to a typical calorimeter that outputs a single set of XYZ tristimulus values for this same wavelength range (380-730 nm). Unfortunately, the cost of a Spectrophotometer is typically significantly higher as compared to a colorimeter.

It can be shown, however, that a correlation exists between tristimulus cross terms and spectral data cross terms. For example, it can be shown that the following relationship "Δ" is small:

$$\Delta = \int R(\lambda)I(\lambda)\bar{y}(\lambda)\bar{z}(\lambda)d\lambda - \int R(\lambda)I(\lambda)\bar{y}(\lambda)d\lambda \int R(\lambda)I(\lambda)\bar{z}(\lambda)d\lambda \qquad \text{eqn. 9}$$

Put another way:

$$\int R(\lambda)I(\lambda)\bar{y}(\lambda)\bar{z}(\lambda)d\lambda \approx YZ \qquad \text{eqn. 10}$$

Thus, upon a review of FIG. 1D and eqn. 10 it can be seen that the "YZ" cross term, for example, provides information that describes the color variability (as related to the product of the Y and Z primaries) that exists along the wavelength interval 110.

Thus, overlapping cross terms (such as XYZ cross terms) can be used to more accurately account for color variability at overlapping wavelength intervals for a color that is defined in an overlapping color space. Cross terms, therefore, can be used to augment the data generated by a relatively inexpensive colorimeter.

8. Construction of a Characterization System

Figure 2:
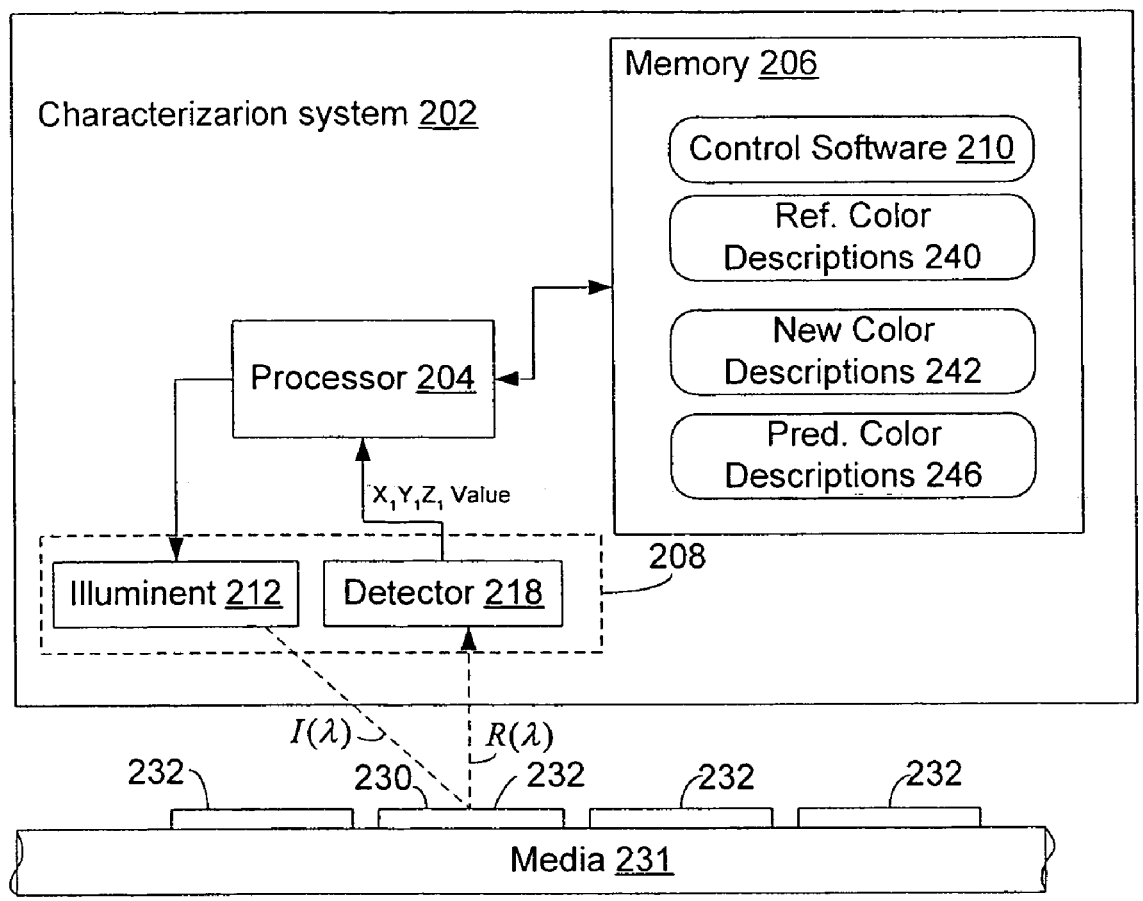
FIG. 2 illustrates one embodiment of a color output device characterization system.

FIG. 2 illustrates one embodiment of the invention in the form of a color output device characterization system 202. As shown, the characterization system 202 includes a processor 204, a memory 206 and a calorimeter 208. The memory 206 includes control software 210 that the processor 204 executes to control the operation of the characterization system 202. In particular, the control software 210 may automate aspects of the characterization procedures described below.

The colorimeter 208 includes an illuminant source 212 (e.g., a light emitting diode) and a light detection system 218 (e.g., a photodiode and an optical filter system).

In operation, the characterization system 202 can be used in the characterization procedures described below to define a device color profile for a target printing device. As will be discussed in greater detail below, this involves the target printing device (i.e., the device to be calibrated) printing a pre-defined characterization target that includes a set of test patches. The characterization system 202 measures these test patches and generates the device color profile. In this embodiment, the characterization system 202 operates to generate a device color profile in accordance with a format specified by the International Color Consortium (ICC).

In FIG. 2, the characterization system 202 is shown presently measuring (via the calorimeter 208) a test patch 230 printed on a media 231. The media 231 may represent, for example, a particular type of paper. The test patch 230 is one of a set of printed test patches 232.

The colorimeter 208 responds to the reflected energy ($R(\lambda)$) from the test patch 230 by outputting to the processor 204 a set of three Tristimulus values ($X_1 Y_1 Z_1$) that describe the measured color of the printed test patch 230. This measured color may depend upon a number of factors, including the reflectance properties of the one or more colorants used to print the test patch 230 as well as the reflectance properties $(R(\lambda))_m$ of the media 231.

9. Target Printing Device

Figure 3A:
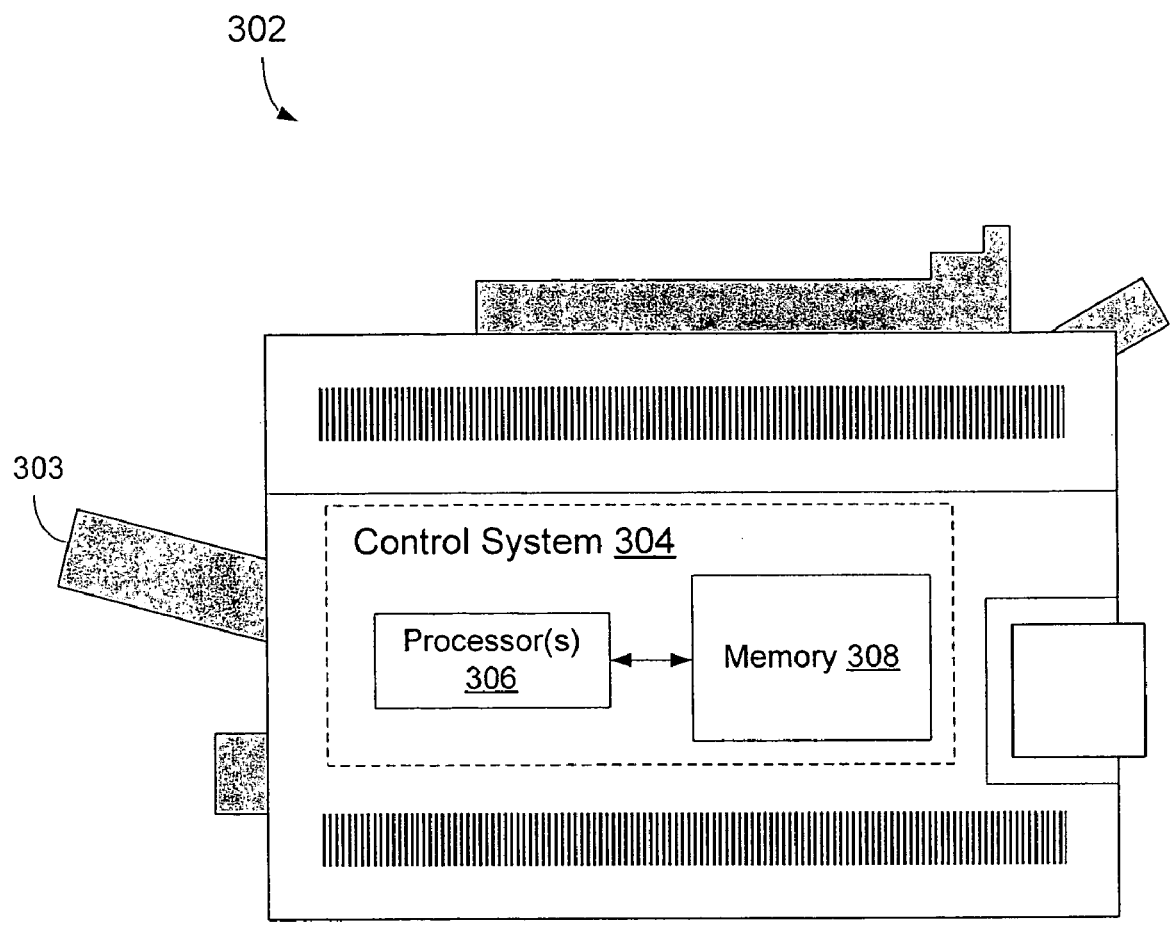
FIG. 3A illustrates a printing device according to an embodiment of the invention.

FIG. 3A illustrates a printing device 302. It is noted that the printing device 302 may represent any type of printing device capable of printing in color. Thus, for example, the printing device 302 may represent: a) a laser printing device that uses liquid or dry toner; b) an inkjet printing device; or c) a digital offset printing press, etc.

As shown the printing device 302 includes a control system 304 that includes one or more processors 306 and one or more memories 308 that may store various firmware modules and data.

Figure 3B:
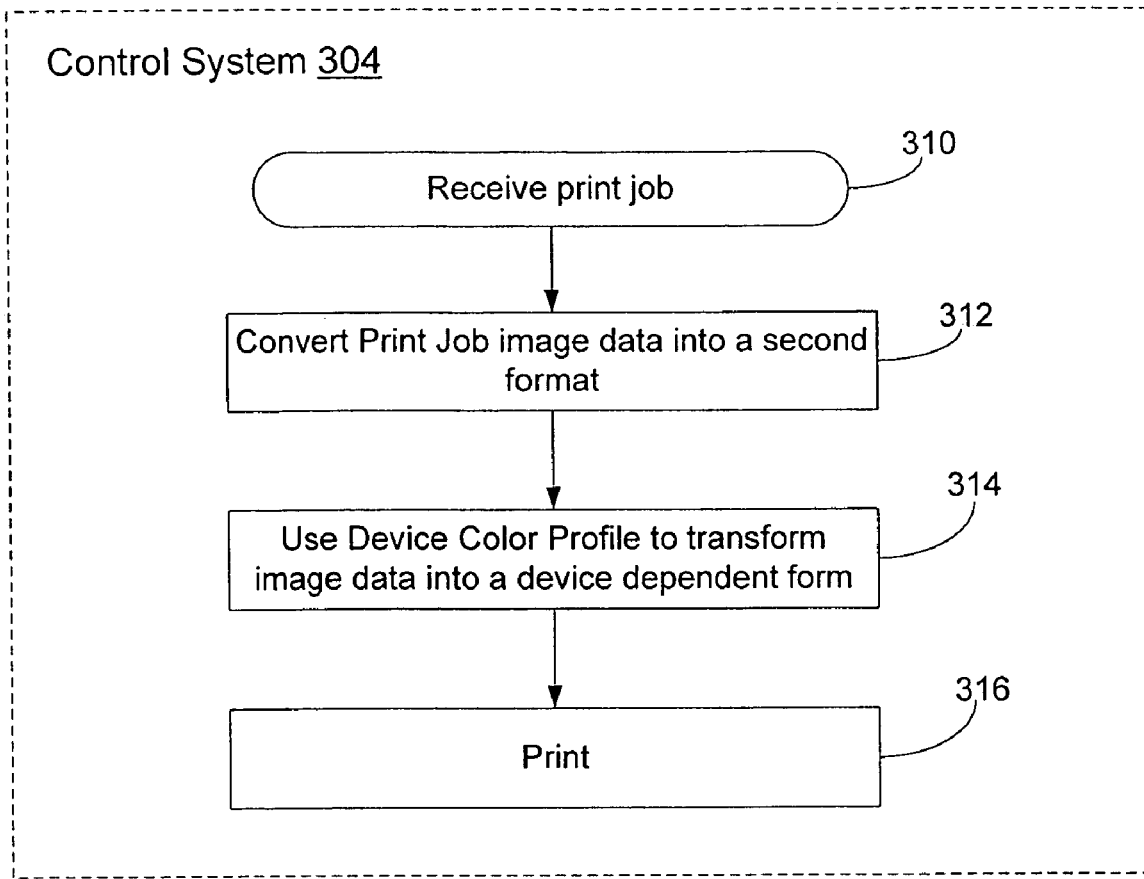
FIG. 3B is a flow diagram illustrating one aspect of the functionality of an exemplary color management system.

One function of the control system 304 is to provide a color management system. FIG. 3B is a flow diagram illustrating, in general terms, one aspect of the color management system functionality.

Referring now to FIG. 3B, the printing device 302 receives a print job (block 310). The print job includes data that describes an image to be printed. At block 312, the control system 304 operates to convert this data into a second format. The data generated at block 312 may express the image in terms of a device independent color space.

At block 314, the control system 304 operates to transform the data generated at block 312 into image data that is expressed in a device dependent color space (e.g., CMYK). The control system 304 uses a device color profile to make this transformation. The device color profile is intended to correct for various characteristics of the printing device 302, including for properties of the media that will be used to print the image.

At block 316, the printing device 302 operates to print corrected image data.

10. Use of the Characterization System to Define a Device Color Profile

Figure 4:
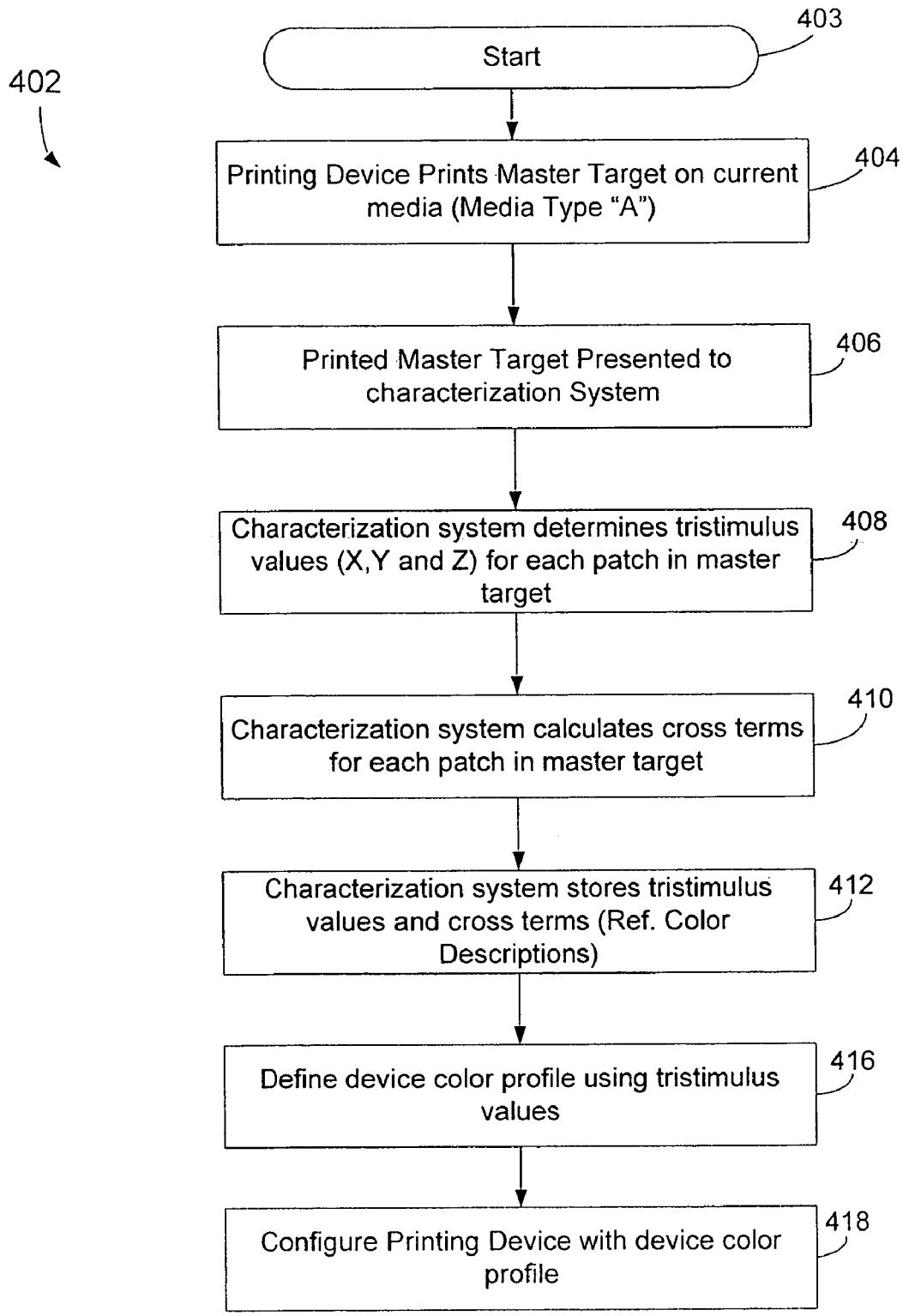
FIG. 4 is a flow diagram illustrating one embodiment of a master characterization procedure.

FIG. 4 illustrates generally a "master" characterization procedure 402 that may be followed to define a new device color profile for the printing device 302. Before we discuss the acts performed in this procedure, however, attention is first directed to FIG. 5.

Figure 5:
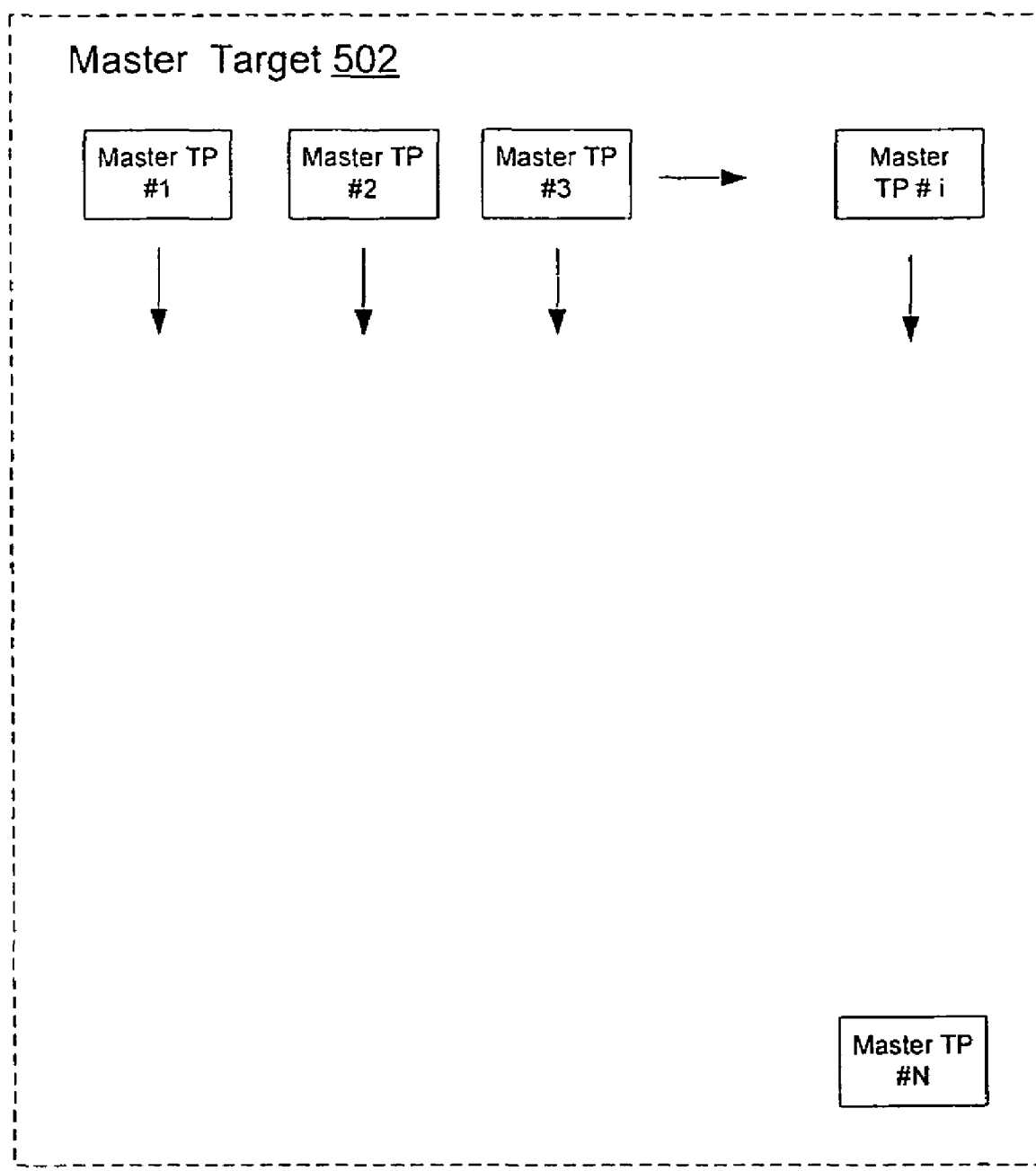
FIG. 5 illustrates a characterization target that may be used in the master characterization procedure.

FIG. 5 illustrates a characterization target 502 that is used in the master characterization procedure 402. For ease of discussion, we may refer to the target 502 as the "master target 502". Further, we will refer to the set of test patches included in the master target 502 as the "master set of test patches".

As shown, the master target 502 includes a set of "N" test patches. The value of "N" and the color definition of each test patch are pre-determined and are intended to span the color gamut capabilities of the printing device 302.

Referring now to FIG. 4, at block 404 the printing device 302 prints the master target 502 on media obtained from the media supply 303. The actual type of media used to print the master target 502 in this instance will be referred to as "media type A".

At block 406, the printed master target 502 is presented to the characterization system 202 so as to allow the characterization system 202 to measure each of the "N" printed master test patches.

At block 408, the characterization system 202 uses the colorimeter 208 to measure the color of each printed master test patch. For each test patch, therefore, three XYZ tristimulus values are generated.

At block 410, the characterization system 202 operates to calculate a set of cross terms for each printed master test patch. In this example, the following set of eleven cross terms are calculated for each printed master test patch: $(XY)^{1/2}$; $(XZ)^{1/2}$; $(YZ)^{1/2}$; $(XYZ)^{1/3}$; XY; XZ;YZ; XX; YY; ZZ; and XYZ.

At block 412, the characterization system 202 stores the tristimulus values and the cross terms for each test patch into the memory 206. These values are represented in FIG. 2 as the "reference color descriptions 240".

Thus, for example, assume the printed media 231 shown in FIG. 2 represents the master target 502 printed at block 404. Thus the media 231 corresponds to media type "A". For the test patch 230, for example, the characterization system 202 generates a reference color description that includes the values shown in Table 1.

TABLE 1

| Test Patch Color Description (as printed on media type "A") | Comment |
| --- | --- |
| $X_1$ | X Color Component Value |
| $Y_1$ | Y Color Component Value |
| $Z_1$ | Z Color Component Value |
| $(X_1 Y_1)^{1/2}$ | Cross term value |
| $(X_1 Z_1)^{1/2}$ | Cross term value |
| $(Y_1 Z_1)^{1/2}$ | Cross term value |
| $(X_1 Y_1 Z_1)^{1/3}$ | Cross term value |
| $X_1 Y_1$ | Cross term value |
| $X_1 Z_1$ | Cross term value |
| $Y_1 Z_1$ | Cross term value |
| $X_1 X_1$ | Cross term value |
| $Y_1 Y_1$ | Cross term value |
| $Z_1 Z_1$ | Cross term value |
| $X_1 Y_1 Z_1$ | Cross term value |

Note that each cross term in table 1 provides additional information with respect to the local variations of the XYZ color component primaries. For example, as indicated above, the "$Y_1 Z_1$" cross term correlates to the value of $\int R(\lambda) I(\lambda) y(\lambda) z(\lambda) d\lambda$ for the test patch 230. Thus, this particular cross term describes the color variation (in terms of the product of the Y and Z primaries) of the test patch 230 at the wavelength interval where the $y(\lambda)$ and $z(\lambda)$ color matching functions overlap (as shown in FIGS. 1C and 1D).

At block 416, the characterization system uses the XYZ tristimulus values determined at block 408 to define a new device color profile for the printing device. This particular operation may be performed using known techniques.

At block 418, the printing device 302 is configured to use this device color profile.

11. Use of Characterization System to Re-define the Device Color Profile

It is noted that the XYZ tristimulus values determined at block 408 may be influenced by a number of factors. One major factor is the reflectance properties of the media used to print the master target 502. Accordingly, the device color profile generated at block 416 provides a color transformation that corrects for the properties of media type "A". It may be desirable, therefore, to redefine the device color profile for the printing device 302 if a different media type will now be used for printing.

Figure 6:
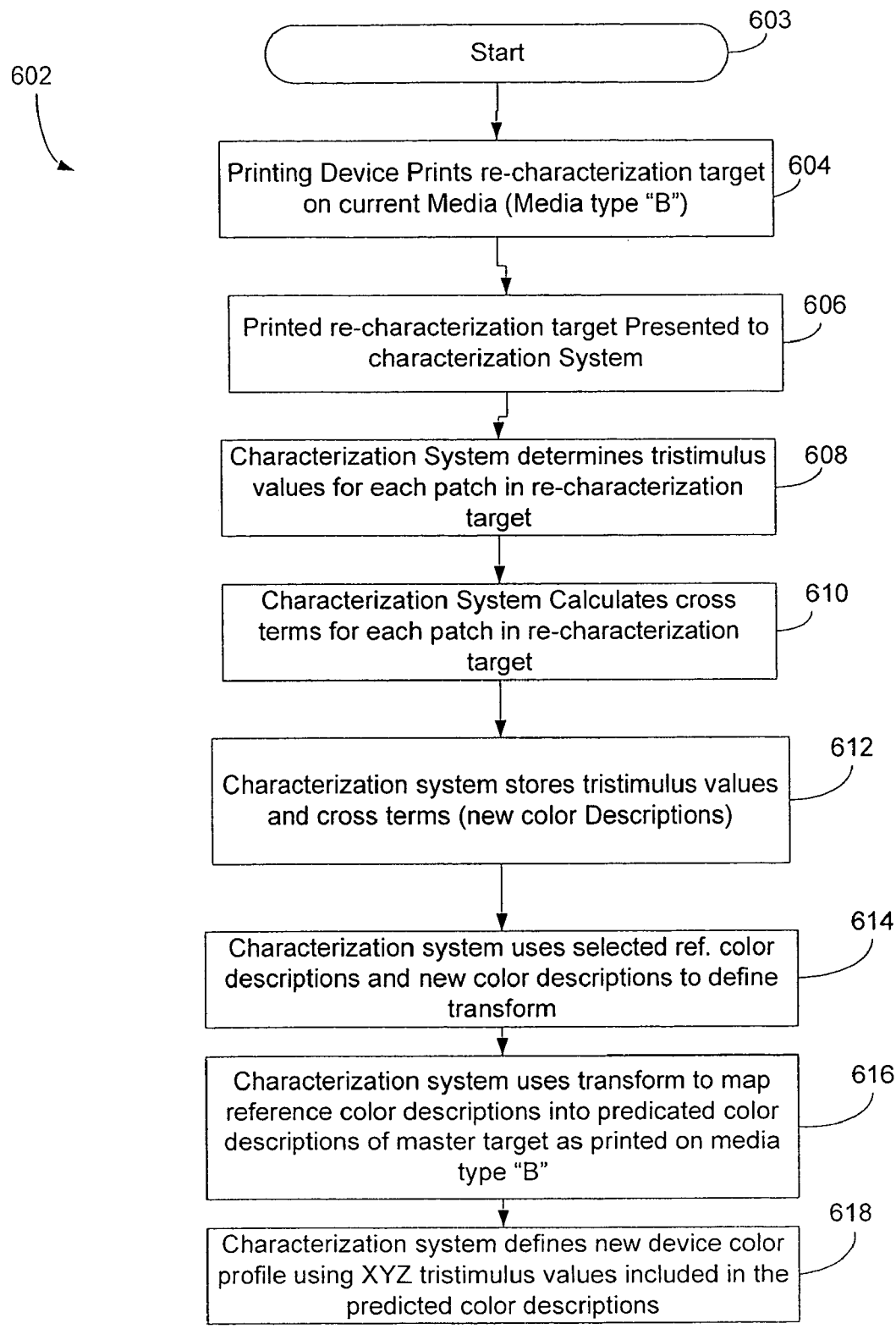
FIG. 6 is a flow diagram illustrating one embodiment of a re-characterization procedure that may be followed to redefine the device color profile.

FIG. 6 illustrates generally a re-characterization procedure 602 that may be followed to redefine the device color profile that corrects for a different media type. Before we discuss the acts performed in the re-characterization procedure, however, attention is first directed to FIG. 7.

Figure 7:
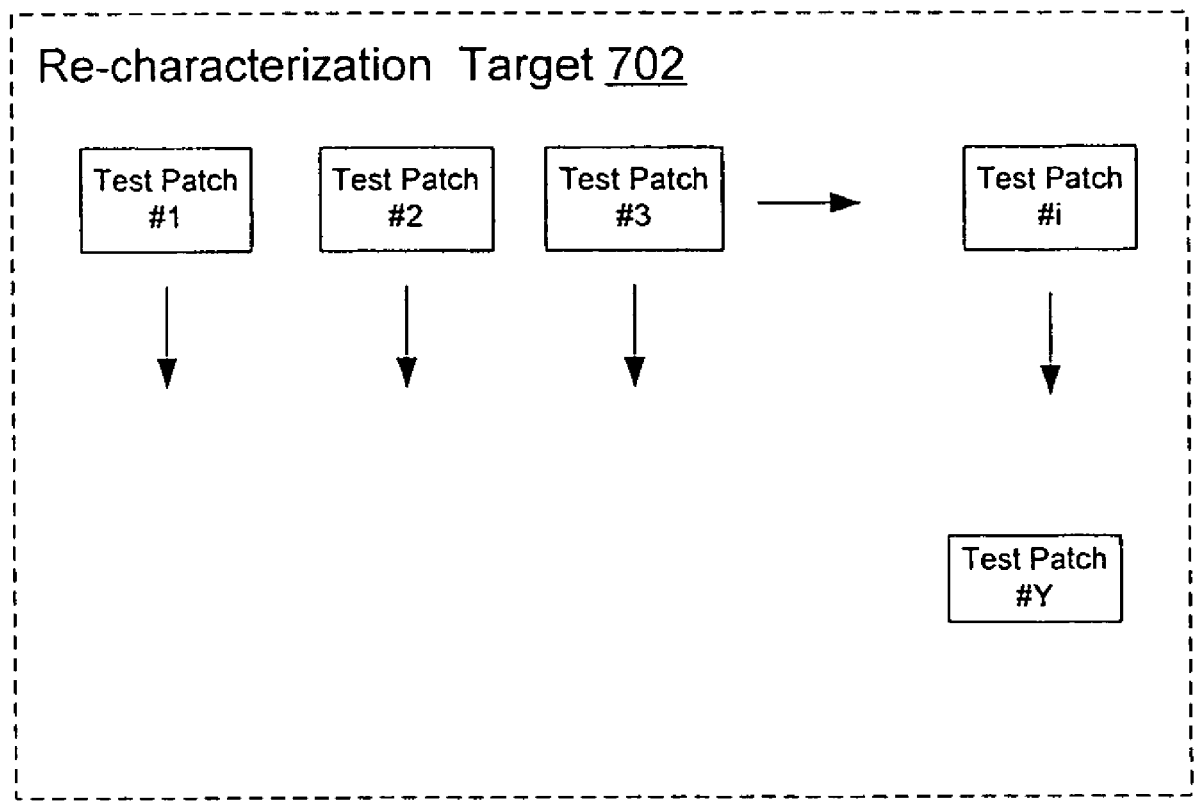
FIG. 7 illustrates a characterization target that may be used in the re-characterization procedure.

FIG. 7 illustrates a characterization target 702 that is used in the re-characterization procedure 602. For ease of discussion, the characterization target 702 may alternatively be referred to herein as the "re-characterization target" 702 as it is used to re-characterize a printing device after the master characterization procedure 402 has been performed. Further, we will refer to the test patches included in the re-characterization target 702 as the "re-characterization test patches".

As shown in FIG. 7, the re-characterization target 702 includes a set of "Y" test patches. Each of the test patches included in the re-characterization target 702 is also included in the master target 502. The value of "Y", however, is less than the value of "N". That is to say, the number of test patches included in the re-characterization target 702 is less than the number of test patches included in the master target 502.

It can be seen, therefore, that a subset of the reference color descriptions 240 stored at block 412 describe the color of the re-characterization test patches as printed on media type "A".

Referring now to FIG. 6, the re-characterization procedure 602 will now be discussed. At block 604, the printing device 302 prints the re-characterization target 702 on the current media. The actual type of media used to print the re-characterization target 702 in this instance will be referred to as "media type B".

At block 606, the printed re-characterization target 702 is presented to the characterization system 202 so as to allow the characterization system 202 to measure each of the printed re-characterization test patches.

At block 608, the characterization system 202 uses the calorimeter 208 to measure the color of each printed re-characterization test patch. For each printed re-characterization test patch, therefore, three XYZ tristimulus values are generated.

At block 610, the characterization system 202 operates to calculate a set of cross terms for each printed re-characterization test patch. As in the master characterization procedure 402, the following set of eleven cross terms are calculated for each of the printed re-characterization test patches: $(XY)^{1/2}$; $(XZ)^{1/2}$; $(YZ)^{1/2}$; $(XYZ)^{1/3}$; XY; XZ;YZ; XX; YY; ZZ; and XYZ.

At block 612, the characterization system 202 stores the tristimulus values and the cross terms for each re-characterization test patch into the memory 206. These values are represented in FIG. 2 as the "new color descriptions 242".

At block 614, the characterization system 202 operates to use regression (e.g., a pseudo inverse regression technique) to define a transformation matrix. The transformation matrix is defined using the following information:
 1. The subset of the reference color descriptions 240 that describe the color of the re-characterization test patches as printed on media type "A"; and
 2. The new color descriptions 242 (which describe the color of the re-characterization test patches as printed on media type "B").

At block 616, the characterization system 202 uses the defined transformation matrix to transform the entire set of reference color descriptions 240 into a predicted set of color descriptions 246. The predicted set of color descriptions 246 describe the predicted color of each master test patch included in the master target 502 if printed on media type "B". The predicted color descriptions 246 are stored in the memory 206.

Thus, for example, at block 616 the characterization system transforms the reference color description illustrated in table 1 for the test patch 230 into a predicted color description of this same test patch if printed on media type B. This predicted color description would include a predicted set of XYZ tristimulus values that describe the predicted color of the test patch 230 as printed on media B.

At block 618, the characterization system 202 operates to use the predicted XYZ tristimulus values for each of the master test patches to re-define a new device color profile for the printing device 302. The printing device 302 can then be configured with this new device color profile.

12. Selection of Master Test Patches for Re-Characterization Target

It can be seen that a certain amount of approximation error is associated with the predicted XYZ tristimulus values. The greater this approximation error, the higher the potential CIE DE 94 reconstruction inaccuracy of the device color profile that is generated from these predicted values.

There are a number of factors that can impact the approximation error of the predicted XYZ tristimulus values. For example, the variability of the media reflective properties, variability of colorant properties, variability of colorant interactions, etc.

Simple iterative experiments can be performed to determine which and how many master test patches are to be included in the re-characterization target. The tristimulus cross term correlation with the spectral cross terms may depend upon the spectral reflectance of the colorant. Experiments to measure this correlation would be useful.

One consideration of this determination, however, is the tradeoff that exists between re-characterization measurement effort (which is directly related to the number of test patches included in the re-characterization target) and the tolerable level of reconstruction inaccuracy of the device color profile.

13. Location of Characterization System

It is noted that in some specific implementations of the embodiments just described, the characterization system 202 may be incorporated within the printing device 302. In these implementations, for example, the printed targets may be presented to the internal colorimeter 208 by an internal media transport system. Furthermore, the processor 204 and the memory 206 may be an integral part of the control system 304 of the printing device 302. In other implementations, for example, the characterization system 202 may be separate from the printing device 302.

14. Manufacturer and Customer Environments

It is noted that in some embodiments, the master characterization procedure may be performed prior to a printing device being shipped to a customer. The next part of this discussion illustrates this feature, by way of an example embodiment.

Figure 8:
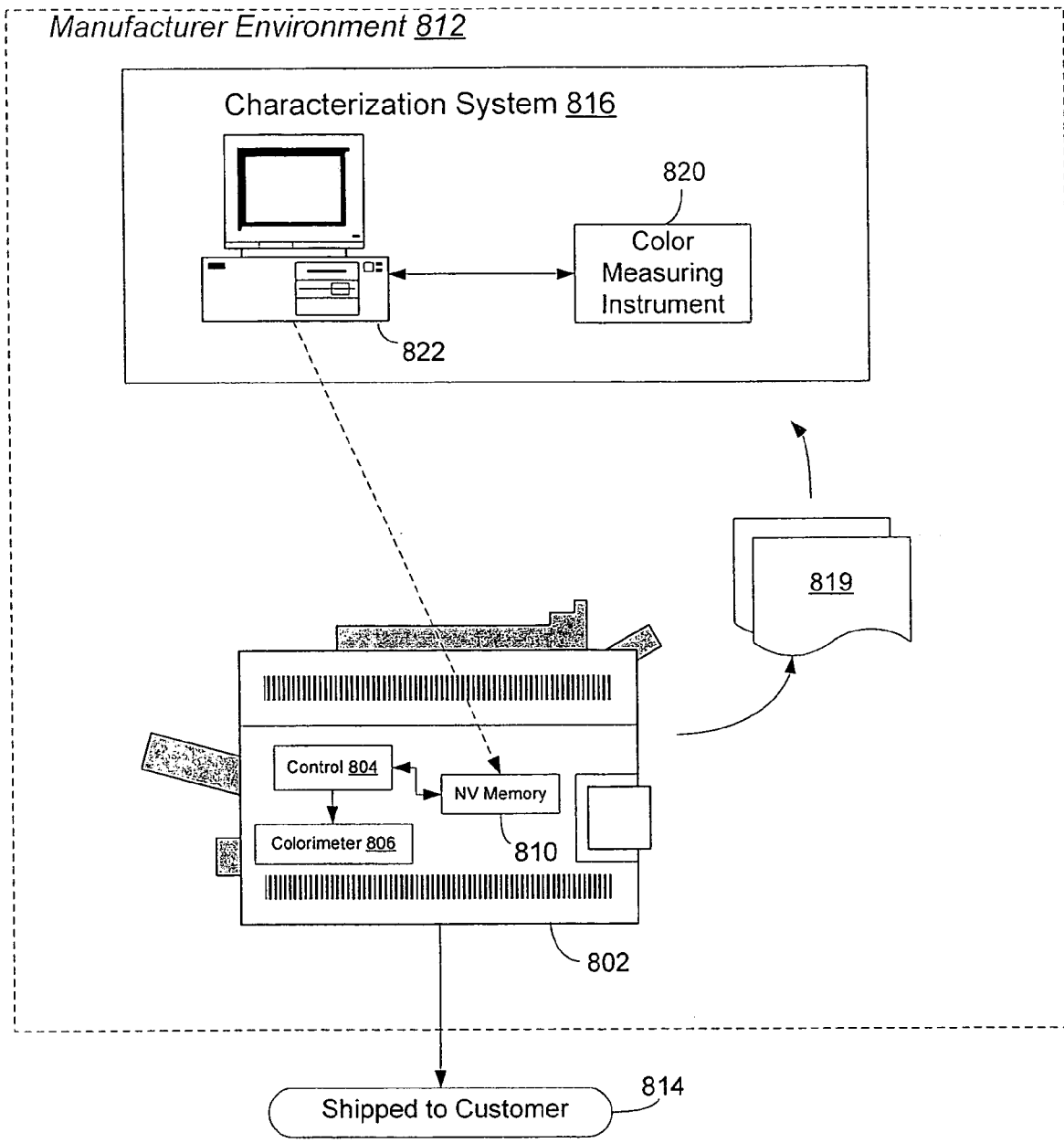
FIG. 8 illustrates a printing device according to an embodiment of the invention.

FIG. 8 illustrates a printing device 802. The printing device 802 includes a control system 804, an internal calorimeter 808, a print engine 810 and a non-volatile memory 810. The printing device 802 is shown presently located within the manufacturer's environment 812, prior to being shipped to a customer 814.

The manufacturer's environment also includes a characterization system 816 that is external to the printing device 802. In this example, the characterization system 816 includes a color measuring instrument 820 and a computer 822 that controls the operation of the instrument 820. In this example, the color measuring instrument 820 is a colorimeter.

Prior to shipping the printing device 802 to the customer 814, the master characterization procedure 402 is performed. This involves the printing device 802 printing a master target on a media 819. The characterization system 816 is used to measure the test patches in the printed master target and generates a device color profile and a set of reference color descriptions. The printing device 802 is configured with the device color profile and the reference color descriptions are stored in the non-volatile memory 810 of the printing device 802. Additionally, a re-characterization target is also stored in the memory 810.

At the customer's location, the printing device 802 can redefine its own device color profile by performing the re-characterization procedure 602 described above. This may be accomplished automatically under the control of the printer control system 804 and may involve the printing device 802: a) printing the re-characterization target that was stored in the memory 810; b) measuring the test patches using the printer's calorimeter 806 and c) performing the various computations of the re-characterization procedure 602.

The printing device 802 may perform the re-characterization procedure, for example, each time a print job is received, each time the printing device 302 is powered on, etc.

OTHER EMBODIMENTS

It is further noted that the present invention may be embodied in the form of a "computer-readable media". As used herein, the phrase "computer readable medium" can refer to any medium that can contain, store or propagate computer executable instructions. Thus, in this document, the phrase "computer-readable medium" may refer to a medium such as an optical storage device (e.g., a CD ROM) or a magnetic storage device (e.g., a magnetic tape). The phrase "computer-readable medium" may also refer to signals that are used to propagate the computer executable instructions over a network or a network system, such as the Public Internet.

Thus, a memory component (e.g., memory 206) that stores computer executable instructions (e.g., control software 210) may represent an embodiment of the invention. Furthermore, signals used to propagate the firmware over a communication link (e.g. an intranet, Public Internet, etc) may also represent an embodiment of the invention.

Although several specific embodiments of the invention have been described and illustrated, the invention is not to be limited to specific forms or arrangements of parts so described and illustrated. For example, it can be seen that the characterization procedures described above may be applied to a display device. The projector would display (instead of print) both a master target of test patches and a re-characterization target. A calorimeter may also be used to measure the displayed patches. The invention is only limited by the claims.

What is claimed is:

1. A method of defining a device color profile, comprising:
   (a) storing a first set of color descriptions, wherein each color description describes a color of a different printed test patch in a first target and includes: (i) a set of color component values defined in an overlapping color space, and (ii) at least one color component cross term;
   (b) obtaining a second set of color descriptions, wherein each color description in the second set describes a color of a different printed test patch in a second target and includes: (i) a set of color component values defined in the overlapping color space, and (ii) at least one color component cross term; and
   (c) using the stored first set of color descriptions and the second set of color descriptions to define a device color profile.

2. The method of claim 1, wherein the overlapping color space is in accordance with the CIE 1931 standard observer.

3. The method of claim 1, wherein the first target includes more test patches, the second target and the overlapping color space is in accordance with CIE 1964 standard observer.

4. The method of claim 1, wherein the act of obtaining includes:
   using a calorimeter to measure the color of a printed test patch in the second target so as to generate a set of XYZ values; and
   computing color component cross term from the set of XYZ values.

5. The method of claim 1, wherein the method is performed by a color printing device.

6. A color printing device, comprising:
   (a) at least one memory storing a plurality of color descriptions each describing a color of a different test patch in a master target, wherein each one of the color descriptions include a set of color components and at least one overlapping cross term;
   (b) a colorimeter; and
   (c) a control system operable to:
      print a re-characterization target that includes a plurality of re-characterization test patches;
      control the calorimeter to measure the color of each of the printed re-characterization test patches; and
      compute a device color profile using the color measurements of the printed re-characterization test patches and the plurality of color descriptions stored in the memory.

7. The color printing device of claim 6, comprising:
   (e) a media transport system; and wherein the control system if further operable to control the media transport system to move at least one media that includes the printed re-characterization test patches in proximity to the colorimeter to enable the calorimeter to measure the color of each of the plurality of test patches.

8. The color printing device of claim 6, wherein the re-characterization target includes a lesser number of test patches than the master target.

9. The color printing device of claim 6, wherein the set of color components are XYZ tristimulus values.

10. The color printing device of claim 6, wherein the memory also stores the re-characterization target.

11. A characterization system, comprising:
   (a) means for accessing a first plurality of color descriptions each describing a color of a different printed test patch in a printed master target;
   (b) means for generating a second plurality of color descriptions each describing a color of a different printed test patch in a printed re-characterization target;
   (c) means for computing a device color profile from the first plurality of color descriptions and the second plurality of color descriptions; and
      wherein each of the first plurality of color descriptions and each of the second plurality of color descriptions include a set of color components that describe a color and at least one overlapping cross term.

12. The characterization system of claim 11, wherein the re-characterization target includes a lesser number of test patches than the master target.

13. The characterization system of claim 11, wherein the means for accessing includes a memory that stores the first plurality of color descriptions.

14. The characterization system of claim 11, wherein the means for generating includes a calorimeter for measuring the printed test patch in the printed re-characterization target.

15. The re-characterization system of claim 11, wherein the characterization system is incorporated within a printing device.

16. The characterization system of claim 11, wherein each of the first plurality of color descriptions and each of the second plurality of color descriptions include a set of XYZ tristimulus values that describe a color and at least one ZYZ overlapping cross term.

17. The characterization system of claim 11, wherein each of the first plurality of color descriptions and each of the second plurality of color descriptions include a set of RGB values that describe a color and at least one RGB overlapping cross term.

18. One or more computer-readable media having computer executable instructions embodied thereon which, when executed by one or more processors in a printing device, cause the one or more processors to:
 (a) use a first plurality of color descriptions and a second set of color descriptions to compute a device color profile;
  wherein each of the first plurality of color descriptions describe a color of a different test patch of a first plurality of test patches in terms of at least three color component values and at least one overlapping cross term; and
  wherein each of the second plurality of color descriptions describe a color of a different test patch of a second plurality of test patches in terms of at least three color component values and at least one overlapping cross term.

19. The one or more computer-readable media of claim 18, wherein the computer executable instructions cause the one or more processors to:
 (b) access the first plurality of color descriptions from at least one memory;
 (c) access the second plurality of color descriptions from at least one memory.

20. The one or more computer-readable media of claim 18, wherein the computer executable instructions cause the one or more processors to:
 (b) access the first plurality of color descriptions from at least one memory in a printing device;
 (c) generate the second plurality of color descriptions using output received from a colorimeter incorporated within the printing device;
  wherein the second plurality of test patches is less than the first plurality of test patches.

21. The one or more computer-readable media of claim 18, wherein the first and second plurality of test patches are printed.

22. The one or more computer-readable media of claim 18, wherein the first and second plurality of test patches are displayed.

23. A method of defining a device color profile, comprising:
 (a) printing a first plurality of test patches on a first media type;
 (b) using a calorimeter to measure the color of each printed test patch included in the first plurality of printed test patches to obtain a set of XYZ tristimulus values;
 (c) first storing a color description of each printed test patch included in the first plurality of test patches, where the color description includes a set of XYZ tristimulus values and at least one XYZ cross term;
 (d) printing a second plurality of test patches on a second media type;
 (e) using the calorimeter to measure the color of each printed patch included in the second plurality of printed test patches;
 (f) second storing a color description of each printed test patch included in the second plurality of test patches, wherein the color description includes a set of XYZ tristimulus values and at least one XYZ cross term;
 (g) using the color descriptions stored in the first storing act and the color descriptions stored in the second storing act to define a device color profile.

24. The method of claim 23, wherein the first media type is different than the second media type.

25. The method of claim 23, wherein the number of patches in the first plurality of printed test patches is more than the number of patches in the second plurality of test patches.

26. The method of claim 23, wherein act (a) and act (d) are performed by a color printing device.

* * * * *

UNITED STATES PATENT AND TRADEMARK OFFICE
CERTIFICATE OF CORRECTION

PATENT NO.         : 7,433,101 B2
APPLICATION NO. : 10/820954
DATED                 : October 7, 2008
INVENTOR(S)       : Steve A. Jacob et al.

It is certified that error appears in the above-identified patent and that said Letters Patent is hereby corrected as shown below:

In column 3, line 66, delete "calorimeter" and insert -- colorimeter --, therefor.

In columns 3 & 4, lines 67 & 1, delete "calorimeter" and insert -- colorimeter --, therefor.

In column 4, lines 10-11, delete "calorimeter" and insert -- colorimeter --, therefor.

In column 4, line 40, delete "calorimeter" and insert -- colorimeter --, therefor.

In column 4, line 60, delete "calorimeter" and insert -- colorimeter --, therefor.

In column 7, line 30, delete "calorimeter" and insert -- colorimeter --, therefor.

In column 8, line 51, delete "calorimeter" and insert -- colorimeter --, therefor.

In column 9, line 13, delete "calorimeter" and insert -- colorimeter --, therefor.

In column 9, line 45, delete "calorimeter" and insert -- colorimeter --, therefor.

In column 10, line 6, in Claim 4, delete "calorimeter" and insert -- colorimeter --, therefor.

In column 10, line 23, in Claim 6, delete "calorimeter" and insert -- colorimeter --, therefor.

In column 10, line 35, in Claim 7, delete "calorimeter" and insert -- colorimeter --, therefor.

In column 10, line 66, in Claim 14, delete "calorimeter" and insert -- colorimeter --, therefor.

In column 12, line 16, in Claim 23, delete "calorimeter" and insert -- colorimeter --, therefor.

UNITED STATES PATENT AND TRADEMARK OFFICE
CERTIFICATE OF CORRECTION

PATENT NO. : 7,433,101 B2
APPLICATION NO. : 10/820954
DATED : October 7, 2008
INVENTOR(S) : Steve A. Jacob et al.

It is certified that error appears in the above-identified patent and that said Letters Patent is hereby corrected as shown below:

In column 12, line 25, in Claim 23, delete "calorimeter" and insert -- colorimeter --, therefor.

Signed and Sealed this

Twenty-fifth Day of August, 2009

David J. Kappos
*Director of the United States Patent and Trademark Office*